(12) United States Patent
Vetter et al.

(10) Patent No.: US 7,760,857 B2
(45) Date of Patent: Jul. 20, 2010

(54) REMOTE COMPUTER SYSTEM AND RELATED EQUIPMENT DIAGNOSTICS USING DATA GATHERED OVER A TELEPHONE CHANNEL

(75) Inventors: Brian J. Vetter, Austin, TX (US); A. Wade Cohn, Austin, TX (US); Arjun Chopra, Brookline, MA (US)

(73) Assignee: Motive, Inc., Austin, TX (US)

( * ) Notice: Subject to any disclaimer, the term of this patent is extended or adjusted under 35 U.S.C. 154(b) by 1330 days.

(21) Appl. No.: 10/349,841

(22) Filed: Jan. 23, 2003

(65) Prior Publication Data

US 2003/0135592 A1 Jul. 17, 2003

Related U.S. Application Data

(60) Provisional application No. 60/433,043, filed on Dec. 12, 2002.

(51) Int. Cl.
*H04M 1/24* (2006.01)
*H04M 3/08* (2006.01)
*H04M 3/22* (2006.01)

(52) U.S. Cl. .................. 379/9.03; 379/9.04; 714/30

(58) Field of Classification Search ............... 379/9.02, 379/9.03, 9.04, 265.01, 265.02, 265.09; 714/30, 714/31, 57; 709/217; 717/106, 124, 168, 717/172
See application file for complete search history.

(56) References Cited

U.S. PATENT DOCUMENTS

| | | | |
|---|---|---|---|
| 4,850,005 A * | 7/1989 | Hashimoto ................ 379/51 |
| 5,367,667 A * | 11/1994 | Wahlquist et al. .............. 714/32 |
| 5,506,898 A | 4/1996 | Constantini et al. ......... 379/266 |
| 5,678,002 A * | 10/1997 | Fawcett et al. .............. 715/709 |
| 5,884,032 A | 3/1999 | Bateman et al. ............. 759/204 |
| 5,894,512 A | 4/1999 | Zenner ...................... 379/265 |
| 6,064,730 A | 5/2000 | Ginsberg .................... 379/265 |
| 6,065,136 A * | 5/2000 | Kuwabara ................... 714/31 |
| 6,134,318 A | 10/2000 | O'Neil .................. 379/266.01 |
| 6,138,158 A | 10/2000 | Boyle et al. ................. 709/225 |
| 6,196,846 B1 * | 3/2001 | Berger et al. ................. 434/118 |
| 6,230,287 B1 * | 5/2001 | Pinard et al. .................. 714/31 |
| 6,263,066 B1 | 7/2001 | Shtivelman et al. ......... 379/266 |
| 6,279,125 B1 | 8/2001 | Klein .......................... 714/38 |
| 6,332,154 B2 | 12/2001 | Beck et al. .................. 709/204 |
| 6,389,132 B1 | 5/2002 | Price ..................... 379/265.01 |
| 6,477,580 B1 | 11/2002 | Bowman-Amuah ......... 709/231 |
| 6,493,695 B1 * | 12/2002 | Pickering et al. .............. 706/47 |
| 6,697,969 B1 * | 2/2004 | Merriam ...................... 714/46 |
| 7,356,738 B2 * | 4/2008 | Owhadi ....................... 714/46 |
| 2003/0031309 A1 * | 2/2003 | Rupe et al. ............. 379/265.02 |
| 2004/0019691 A1 * | 1/2004 | Daymond et al. ........... 709/231 |

* cited by examiner

*Primary Examiner*—Quoc D Tran
(74) *Attorney, Agent, or Firm*—Hitt Gaines, PC

(57) ABSTRACT

A method, system, computer system and computer program product to remotely diagnose a problem with a computer system or related equipment using data provided by a user of the computer system via telephone. A signal including speech and/or DTMF tones is received via a telephone channel from a user of the computer system or equipment. The computer system and/or equipment associated with the signal is identified using information from the signal, such as a user name, caller ID, telephone number, or password. A source of diagnostic information about the computer system is identified, and diagnostic information is gathered from the source. The diagnostic information can be used to fix the problem or provided to a customer service agent for use in further problem diagnosis.

38 Claims, 9 Drawing Sheets

REMOTE COMPUTER SYSTEM AND RELATED EQUIPMENT DIAGNOSTICS USING DATA GATHERED OVER A TELEPHONE CHANNEL

CROSS-REFERENCE TO RELATED APPLICATION

This application claims the benefit of priority based on U.S. Provisional Patent Application Ser. No. 60/433,043, filed Dec. 12, 2002, entitled "Coordinated Remote Computer System Diagnostics Using Internet and Telephone Channels," and naming Brian J. Vetter, A. Wade Cohn, and Arjun Chopra as the inventors. The above-referenced application is hereby incorporated by reference herein in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to remote diagnosis of problems with computer systems, equipment related to or accessible via networks of computer systems, and services related to operation of computer systems and/or equipment. More particularly, the invention relates to remote diagnosis of problems with computer systems, equipment, and services using data gathered over a telephone channel.

2. Description of the Related Art

Many businesses with a large number of computer system users provide customer service call centers to assist with computer system problems experienced by the users. Customer support may be provided by various vendors of computer software and/or hardware, by in-house personnel, and/or by a professional computer system support organization.

Examples of the types of computer system problems that a user encounters include being unable to connect his or her computer system to the Internet, launch a particular software application, send and/or receive e-mail, print to a particular printer, and so on. However, when the user telephones the customer service call center, the user often must wait for a long time for a customer service agent to become available. The customer service agent may not have the expertise or the right tools to solve the problem. Furthermore, the computer user often lacks the technical expertise to adequately describe the problem or to gather information needed by the customer service agent to fix the problem; thus, the telephone experience can be frustrating for both the computer user and the customer service agent.

Because providing customer support is very expensive, the efficiency of customer service agents is paramount. Some technical support vendors, such as Motive Communications, Inc., ("Motive") provide call-center products that can automatically fix problems that users may have with their computers. These call center products include a client software component installed on a user computer system and a server software component, running on a server in data communication with the user computer system via a network. The server software component directs the client software component to gather diagnostic information relating to a problem on the user computer system. Rather than telephone a customer service agent, users can use the client software component that connects with the server software component to diagnose computer system problems. Using some automated call-center products, such as those provided by Motive, the user may search a database of help information and, if desired, connect to a live customer service agent for further assistance. Motive products also provide for diagnostic information gathered during the user's search to be electronically forwarded to the agent, greatly enhancing the customer service agent's ability to diagnose the problem.

While these automated call-center systems solve the problems of automatically fixing computer problems and/or communicating electronically gathered diagnostic information to the customer service agent, not all individuals and organizations have such automated call center software. Furthermore, computer users that do have automated call center software sometimes still seek help from a customer service agent via the telephone. For example, a user with a problem connecting his or her computer system to the server hosting the automated call center product may be unable to use the automated call-center software to report the problem. It would be an improvement to be able to use the diagnostic software of an automated call-center product when the user contacts the call center via telephone. Another improvement would be to use functionality of automated call-center software to diagnose problems on user computer systems or associated equipment that do not have a client software component installed.

A solution is needed that will enable users to obtain assistance with computer system, equipment and service problems using the telephone and allow diagnostic data to be gathered from their computer systems, equipment and service providers remotely, with or without the user's intervention.

SUMMARY OF THE INVENTION

The present invention provides a method, system, computer system, and computer program product to remotely diagnose a computer system, equipment or service problem. The diagnosis uses data provided by a computer system user via a telephone channel and may gather and use additional information. Initially, a signal including speech and/or a tone, (e.g., dual-tone multi-frequency tones), is received via a telephone channel from a computer system user. A problem entity associated with the signal is identified, corresponding to the computer system, equipment, or service. The problem entity is identified using information from the signal, such as a user name, caller ID, telephone number, or password. A source of diagnostic information about the problem entity is identified, and diagnostic information is gathered from the source. Examples of potential diagnostic information sources include the computer system itself, equipment associated with operation of the computer system and/or software installed on the computer system, other computer systems, and software systems related to operation of the computer system and associated services, including software systems related to the user, such as records of payments for computer-system related services. The diagnostic information can be used to fix the computer system problem or can be provided to a customer service agent for use in further problem diagnosis.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, and computer program product to remotely diagnose a computer system, associated equipment, or service problem using data provided by a user of the computer system via a telephone channel. A signal including speech and/or dual-tone multi-frequency (DTMF) tones is received via a telephone channel from a computer system user. A problem entity, corresponding to the computer system, equipment and/or service associated with the signal is identified using information from the signal, such as a user name, caller ID, telephone number, or password. A source of diagnostic information about the computer system is identified, and diagnostic information is gathered from the source. Potential diagnostic sources include the computer system itself, equipment associated with operation of the computer system, other computer systems, software systems related to operation of the computer system, software systems related to the computer system- or equipment-related services, such as records of payments for such services, and so on. The diagnostic information can be used to fix the problem or can be provided to a customer service agent for further problem diagnosis.

Figure 1A:
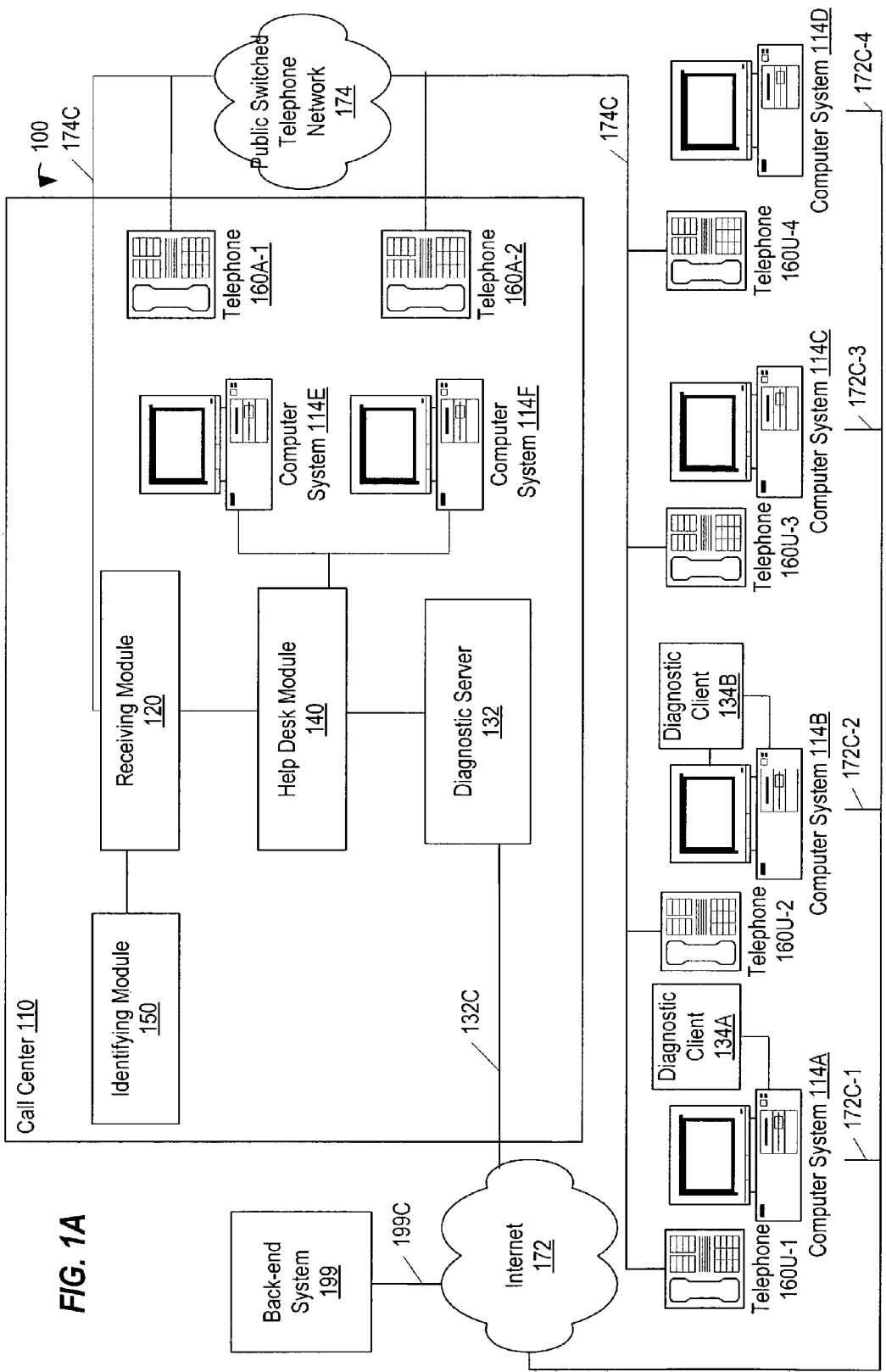
FIG. 1A shows an example of a system for remote computer system diagnosis including the ability to gather data via a telephone channel.

FIG. 1A shows an example of a system for remote computer system diagnosis including the ability to gather data via a telephone channel. System 100 is used by agents of call center 110 to provide service to users of computer systems 114A, 114B, 114C and 114D. Each of user computer systems 114A through 114D has connectivity to Internet 172 via respective connections 172C-1, 172C-2, 172C-3, and 172C-4. The example shown in FIG. 1A shows diagnosis of the computer system itself, although one of skill in the art will recognize that other problem entities, such as equipment and/or systems related to the computer system or accessible by virtue of being coupled to a network of computer systems, may also be diagnosed using the methods and systems described herein.

Installed on computer systems 114A and 114B are diagnostic clients 134A and 134B, which are explained in further detail with reference to FIG. 1C below. Users of computer systems 114A and 114B can initiate a connection to call center 110 using diagnostic clients 134A and 134B, through connections 172C-1 and 172C-2 to Internet 172, and through connection 132C to diagnostic server 132. Users of computer systems 114A and 114B can also initiate a connection to call center 110 via user telephones 160U-1 and 160U-2 and receiving module 120 of call center 110; other modules of call center 110, such as diagnostic server 132, may then establish a connection via Internet 172 and connections 172C-1 and 172C-2 to computer systems 114A and 114B.

Computer systems 114C and 114D do not have diagnostic clients, and users of computer systems 114C and 114D use user telephones 160U-3 and 160U-4 to access call center 110 via receiving module 120. Other modules of call center 110, such as receiving module 120, may instruct the user of one of computer systems 114C and 114D to establish a connection to, for example, diagnostic server 132.

Agents in call center 110 access a help desk module 140 using computer systems such as computer systems 114E and 114F. Agents in call center 110 also speak with users via telephone via public switched telephone network (PSTN) 174 connected to user telephones 160U-1, 160U-2, 160U-3, and 160U-4 and agent telephones 160A-1 and 160A-2. Channel 174C of PSTN 174 is used herein as an example of a particular telephone channel from which a signal is received.

Help desk module 140 interacts with a diagnostic server 132 and a receiving module 120. Receiving module 120 receives input from users via a telephone channel such as channel 174C. Receiving module 120 also interacts with an identifying module 150. Each of these modules is explained in further detail below. Organization of system 100 into these various modules is merely an example, and in fact many other architectures can be implemented that achieve the same functionality.

Internet 172 provides connectivity between diagnostic server 132 and user computer systems 114A through 114D. One of skill in the art will recognize that user computer systems 114A through 114D may connect to a diagnostic or call center system such as system 100 via other types of networks; the Internet is used as an example only and is not intended to be limiting. Furthermore, one of skill in the art will recognize that equipment and/or systems accessible via Internet 172 or another network to which one of computer systems 114A through 114D is connected may also be diagnosed using the methods and systems described herein.

One of skill in the art will also recognize that another module of system 100 may provide the web server component (not shown) for communication via Internet 172. For example, diagnostic server 132, help desk module 140, or receiving module 120 may direct a user of computer system 114C or 114D to connect to a web page using a web browser (not shown), which would establish a connection to a web site via Internet 172.

Internet 172 also provides connectivity between diagnostic server 132 and other software systems, such as back-end system 199 via connection 199C. Back-end system 199 may provide information related to operation of a user computer system, such as one of user computer systems 114A through 114D. For example, back-end system 199 may provide Internet connectivity to users. Diagnostic server 132 is capable of interfacing with other software systems, such as back-end system 199, which can provide diagnostic information about other computer systems, equipment and/or computer system- or equipment-related services.

Receiving module 120 is the component that enables system 100 to receive data via a telephone channel and use that data to diagnose a problem with the calling user's computer system. Identifying module 150 uses data provided via the telephone channel and identifies the computer system associated with the calling user.

Figure 1B:
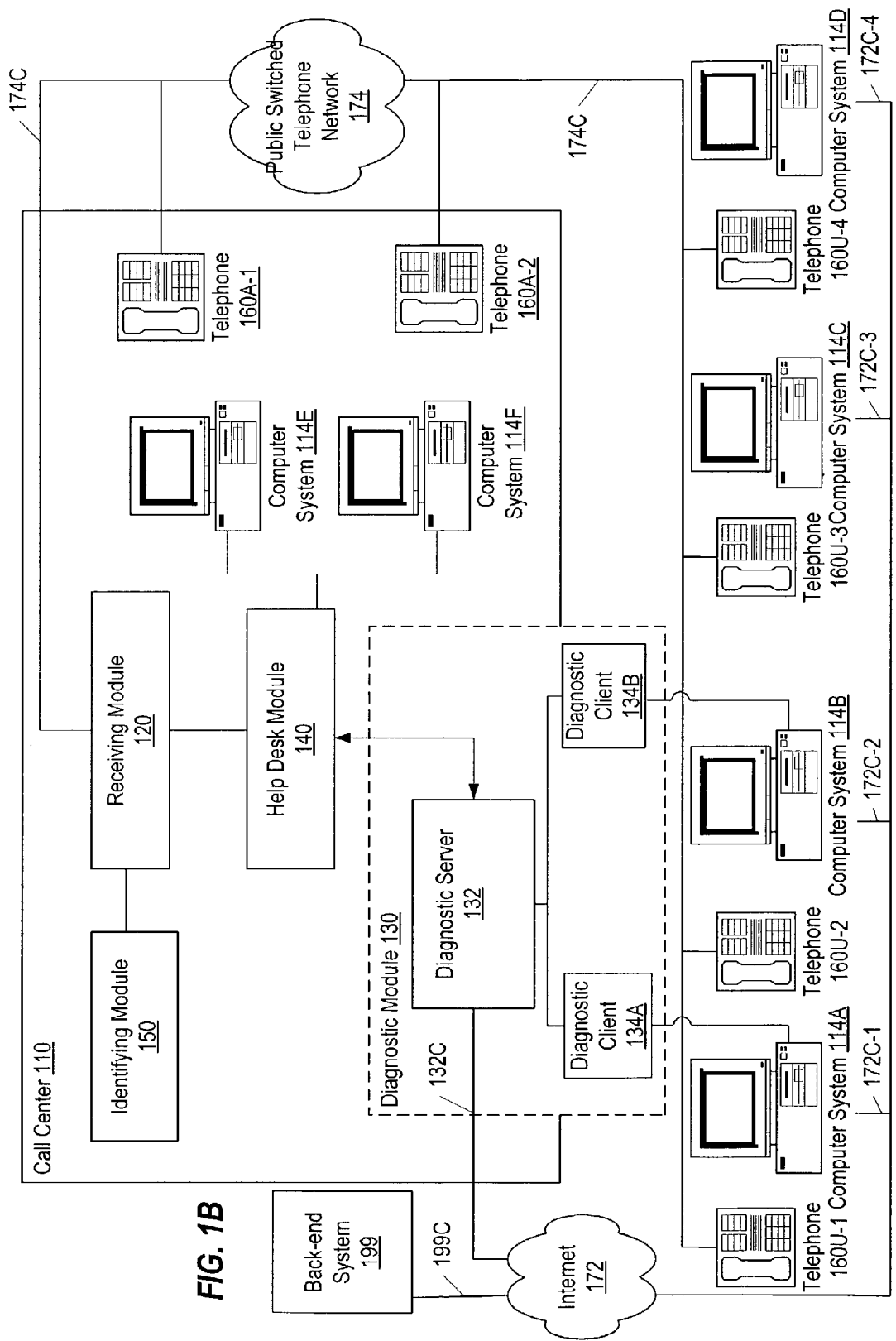
FIG. 1B shows example components of the diagnostic module of FIG. 1A.

FIG. 1B shows example components of diagnostic module 130 of FIG. 1A. Diagnostic server 132 is a server component of system 100, and diagnostic clients 134A and 134B are client-side components installed on user computer systems 114A and 114B. In one embodiment, diagnostic module 130 includes a web server component (not shown) that enables diagnostic server 132 and diagnostic clients 134A and 134B to communicate via the Internet.

Assume that a user of computer system 114A uses diagnostic client 134A to attempt to diagnose a problem with his computer system. Diagnostic server 132 can obtain diagnostic information directly from computer system 114A via diagnostic client 134A, either by running programs that are part of diagnostic client 134A or by downloading programs that can be executed by diagnostic client 134A. In one embodiment, an "incident record" is created at diagnostic server 132 for each invocation of a diagnostic client, such as one of diagnostic clients 134A and 134B, to assist with a user's computer system problem.

Figure 1C:
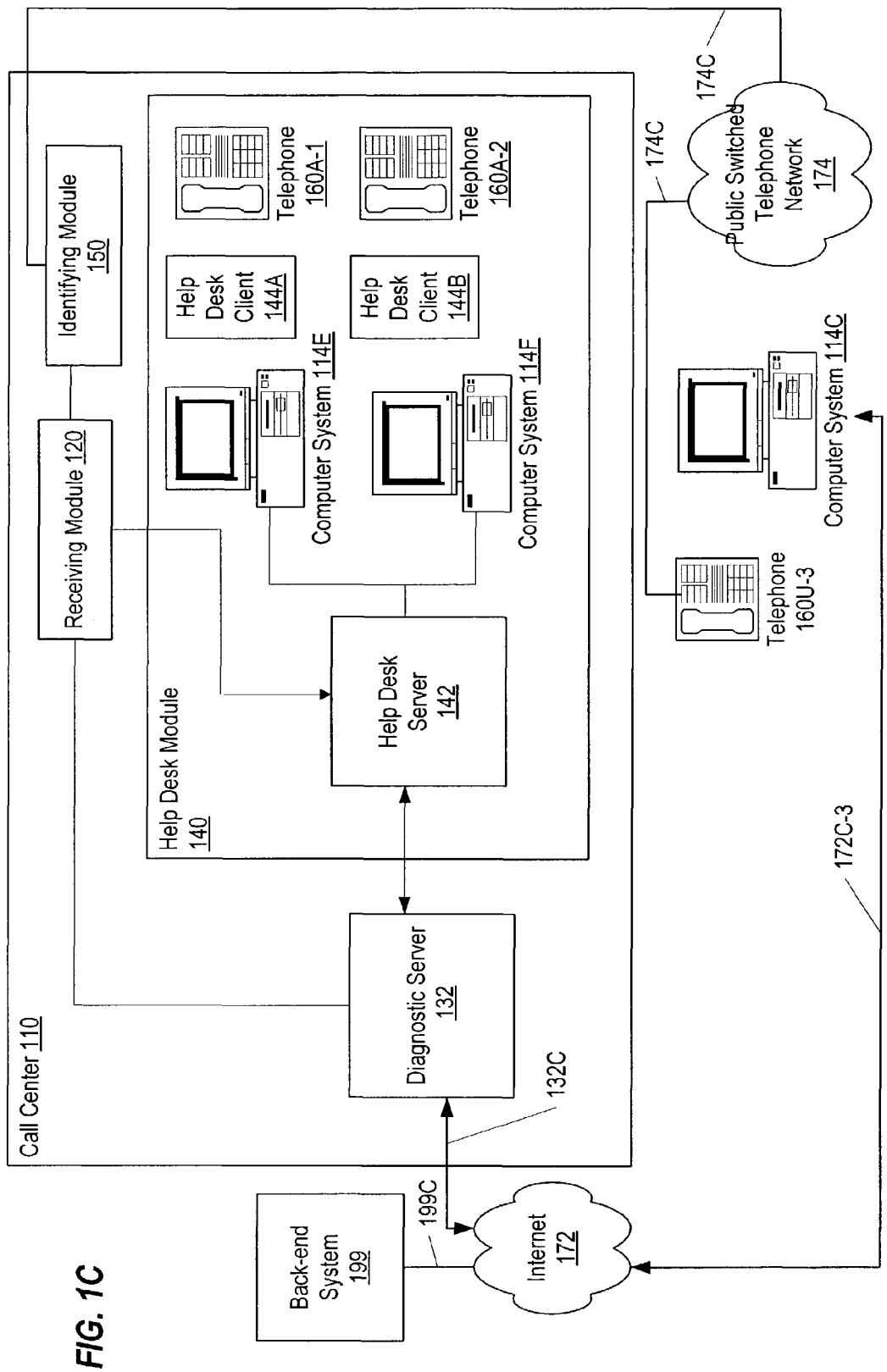
FIG. 1C shows example components of the help desk module of FIG. 1A.

FIG. 1C shows example components of help desk module 140. Help desk server 142 is a server component of help desk module 140. Help desk clients 144A and 144B are client components of help desk module 140 running on respective agent computer systems 114E and 114F. Data, such as diagnostic information gathered for a computer system, are provided from receiving module 120 to help desk server component 142. Help desk server component 142 passes the diagnostic information to help desk clients, such as help desk clients 144A and 144B, for use by agents in diagnosing a problem with the user's computer system.

In one embodiment, a help desk client (such as help desk clients 144A and 144B) enables a customer service agent to create an "incident record" to record information about the problem, user, and computer system, as well as diagnostic information gathered from the computer system and/or associated systems. Help desk clients may also include a viewer module specifically for presenting diagnostic information to agents. The viewer module can present diagnostic information gathered from the user's computer system, as well as identifying data provided over the telephone channel by the user.

In one embodiment, diagnostic information is provided in the form of a diagnostic code. As mentioned earlier, diagnostic information can be provided by running a diagnostic program on the user's computer system, equipment, and/or associated back-end system. Such a diagnostic program can be part of a diagnostic client, such as one of diagnostic clients 134A and 134B, a user may be directed to download a program from the Internet that can be run to gather diagnostic information, or a back-end system may download a program to associated equipment. Once the diagnostic program is run, the diagnostic information can be summarized in the form of a diagnostic code. The diagnostic code can, for example, indicate the type of problem discovered and/or the type of diagnoses performed and the results. The diagnostic code may be provided to the user, who can verbally provide the diagnostic code to an agent via telephone. In addition, the diagnostic code may be provided to the agent via the viewer module described above.

Figure 1D:
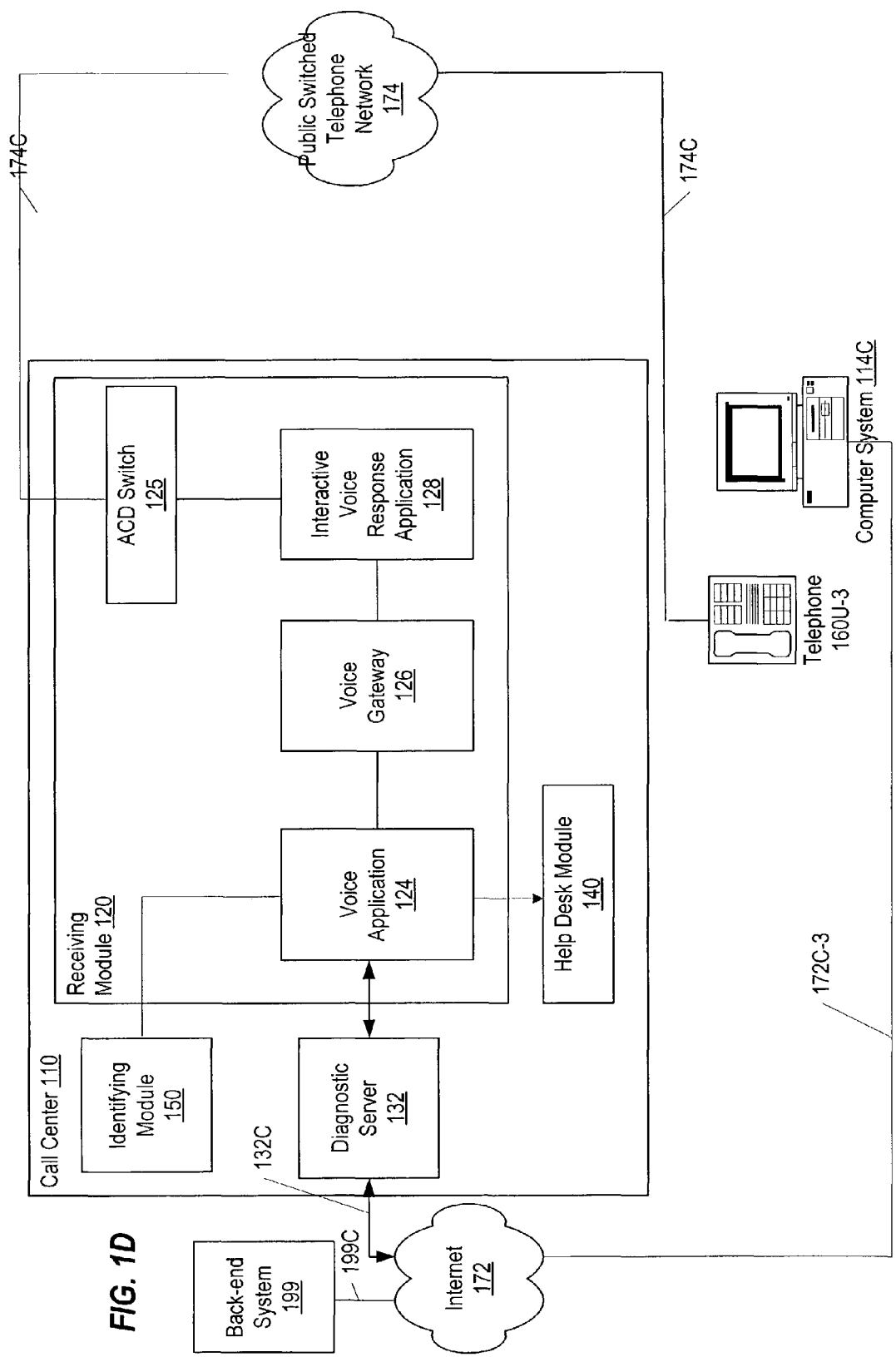
FIG. 1D shows example components of the receiving module of FIG. 1A.

FIG. 1D shows example components of receiving module 120. Assume that a telephone call is received from the user of computer system 114C via telephone 160U-3 on channel 174C. The incoming telephone call is received by automated call distribution (ACD) switch 125 and passed to interactive voice response application 128. Interactive voice response application 128 accepts input in the form of speech or via a telephone keypad, which produces DTMF tones.

Interactive voice response applications, such as interactive voice response application 128, are commercially available today. Interactive voice response applications can be provided as part of Windows-based personal computers equipped with board-level voice gateway hardware and telephony hardware (not shown) to connect to PSTN via a T1, Plain Old Telephone Service (POTS), or Integrated Services Digital Network (ISDN) telephone connection. In one embodiment, interactive voice response application 128 resides on the same server as voice gateway 126, although interactive voice response application 128 may reside on a separate server.

Interactive voice response application 128 provides data in the form of a signal, representing either voice or a tone, such as a DTMF tone, to voice gateway 126. Voice gateway 126 interprets the signal received and passes a Hyper-Text Transfer Protocol (HTTP) request to a web server component (not shown) of voice application 124. The HTTP request may receive a response in the form of a web page that is converted to speech by voice gateway 126.

Voice application 124 may call identifying module 150 to identify the computer system associated with the incoming signal. For example, identifying module 150 may use the caller's name, caller ID, password, or other information provided via channel 174C to determine a unique identifier for the problem entity, corresponding to the computer system, equipment, service, or back-end system associated with the calling user. Once the computer system is identified, data are gathered about a problem with that computer system, equipment, service, or back-end system.

Figure 2:
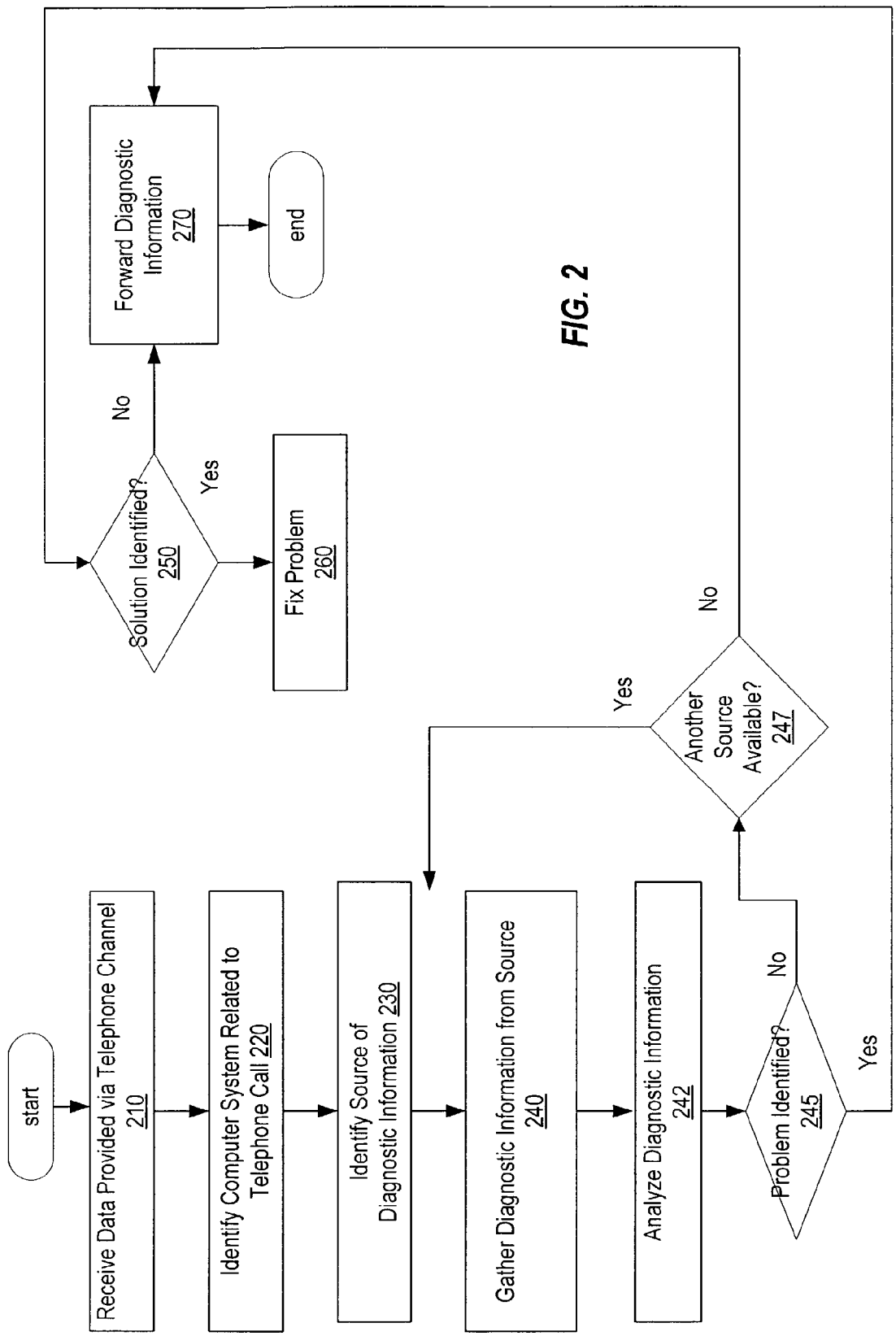
FIG. 2 is a flowchart showing steps in diagnosing a computer system remotely using data gathered via a telephone channel.

FIG. 2 is a flowchart showing steps in diagnosing a computer system remotely using data gathered via a telephone channel. In "Receive Data Provided via Telephone Channel" step 210, data are received from a computer system user via a telephone channel. The user may input data verbally or may use the telephone keypad to enter DTMF tones. The user may be requested to iteratively provide data items. For example, the user may be requested to provide his or her name, company, and other information that can be subsequently used to identify the user, computer system, equipment, service, and/or back-end system. In one embodiment, the identification data provided by the user are used by an identifying module, such as identifying module 150 of FIG. 1A, to identify the computer system, equipment, service, and/or back-end system. Alternatively, the user may not be requested to provide identification data; for example, system 100 may be capable of identifying the user, computer system, equipment, service, or back-end system based solely on data, such as caller ID information, that is part of the originating signal for the telephone call.

In "Identify Computer System Related to Telephone Call" step 220, a computer system is associated with the telephone call. For example, caller ID information for the telephone call may be associated with a single user of a particular computer system. Such identification information may be determined, for example, by accessing databases (not shown) associated with system 100. For example, caller ID information can be used to search a customer database for customer information related to the caller, and then an equipment database could be searched for a computer system associated with the customer information. One of skill in the art will recognize that, while this example shows identification of a computer system, equipment, a back-end system, or a system or device accessible via a network of computer systems may be identified by this step of the method.

In "Identify Source of Diagnostic Information" step 230, a source of diagnostic information for the user's computer system is identified. For example, the user's computer system may have a diagnostic client installed (e.g., diagnostic client 134A of FIG. 1A) that serves as a diagnostic information source. As another example, the user's computer system may have associated equipment (e.g., equipment providing broadband cable service, including Internet service) through which the user's computer system gains access to the Internet. This equipment can serve as a source of diagnostic information. The equipment can be automated to gather diagnostic information to assist with problem diagnosis, either directly or by a back-end system associated with the equipment. As another example, the user's computer system may be associated with other back-end computer systems that can provide diagnostic information about the user's computer system. These back-end systems may include, for example, computer systems associated with service providers that may affected operation of the problem computer system. Examples of such back-end systems are e-mail servers and service provider systems that track data network outages.

In "Gather Diagnostic Information from Source" step 240, diagnostic information related to the user's computer system is gathered. This diagnostic information can include such diverse information as configuration settings on the user's computer system, versions of software installed on the computer system, information as to whether a modem of the computer system is operating correctly to provide data communication between the computer system and the Internet, or status of a data network accessed by the computer system. Gathering diagnostic information can be an iterative process, and several diagnostic programs can be run to gather information that may be useful for problem diagnosis.

In "Analyze Diagnostic Information" step 242, the diagnostic information gathered is analyzed to determine whether the problem can be identified. Control proceeds to "Problem Identified" decision point 245, where a determination is made about whether the problem can be identified based upon the analysis of the diagnostic information. If the problem is not identified, control proceeds to "Another Source Available" decision point 247. If the problem is identified, control proceeds to "Solution Identified" decision point 250.

At "Another Source Available" step 247, if another source of diagnostic information for the user's computer system is not available, control proceeds to "Forward Diagnostic Information" step 270. If another source is available, control returns to "Identify of Diagnostic Information" step 230.

At "Solution Identified" decision point 250, a determination is made whether a solution to the problem is identified. If a solution is identified, control proceeds to "Fix Problem" step 260, and the problem is fixed. For example, an updated version of a software program may be available to correct a particular error in software installed on the user's computer system; the updated version can be downloaded to the user's computer system and installed to correct the computer system problem. As another example, a hardware problem (e.g., a malfunctioning modem) may be identified as the cause of the user's computer system problem. In this example, the solution may be to forward the user's telephone call to a service department that repairs modems. In one embodiment, the user's permission to fix a problem is obtained before the problem is fixed. If a solution cannot be identified, control proceeds to "Forward Diagnostic Information" step 270. For additional information on diagnosis of user's computer system problems, see, for example, U.S. Pat. No. 6,145,096, "Method, System and Computer Program Product for Iterative Distributed Problem Solving," having inventors Thomas William Bereiter and Brian Jay Vetter and assigned to Motive Communications, Inc.

In "Forward Diagnostic Information" step 270, diagnostic information gathered during the telephone call can be electronically forwarded to a customer service agent. The agent can be provided not only a description of the user's computer system problem, but the agent can also view the diagnostic information collected thus far. The diagnostic information can be used by the agent for further problem diagnosis. Additionally, if the user's telephone call is on hold, the call can be forwarded to the agent who can use the diagnostic information as he or she converses with the user via telephone.

Figure 3:
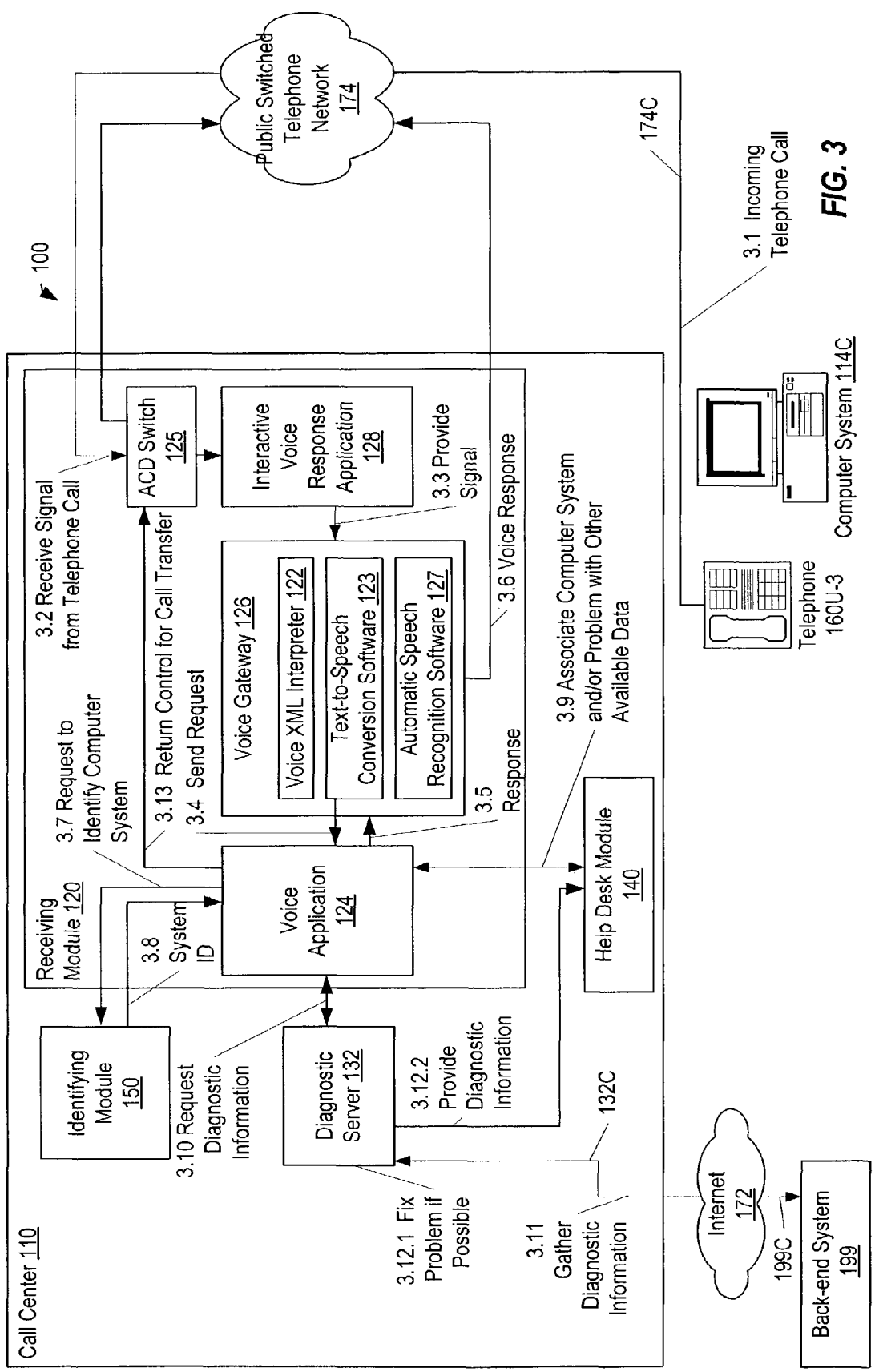
FIG. 3 shows an example data flow through the system illustrated in FIG. 1D.

FIG. 3 shows an example data flow through the system illustrated in FIG. 1D. In action 3.1, a user of computer system 114C places a telephone call using user telephone 160U-3 via telephone channel 174C. In action 3.2, the telephony hardware receives a signal from the incoming telephone call. Telephony hardware (not shown) associated with receiving module 120 can be included in a voice gateway server (not shown) hosting voice gateway 126. Alternatively, telephony hardware can be included on a separate server (not shown) from the server hosting voice gateway 126.

As mentioned previously, the incoming signal may include speech and/or DTMF tones. In action 3.3, ACD switch 125 and interactive response application 128 provide the signal to voice gateway 126, and in action 3.4, voice gateway 126 sends a request to voice application 124. In one embodiment, the request is an Extensible Markup Language (XML) document sent via Hyper-Text Transfer Protocol (HTTP), hereinafter referred to as an HTTP request.

In the embodiment shown in FIG. 3, voice gateway 126 includes a Voice XML interpreter 122, Text-to-Speech conversion software 123, and Automatic Speech Recognition software 127. One of skill in the art will recognize that protocols other than Voice XML may be used, such as Speech Application Language Tags (SALT), and that Voice XML is provided as an example only. Voice XML interpreter 122 of voice gateway 126 interprets the voice or DTMF tones of the signal and produces XML output communicated in the form of an HTTP request. If the input signal is speech, Automatic Speech Recognition software 127 of voice gateway 126 may interpret the speech. In one embodiment, an HTTP request is formed based upon the information included in the speech. If the input signal includes DTMF tones, other components of voice gateway 126 (not shown) may be used to form an HTTP request.

The HTTP request is then used to retrieve a web page to be provided in response to the signal received. The web page may include text that can be read via the telephone channel, for example, by Text-to-Speech conversion software 123 described above, as shown in action 3.5. Alternatively, the web page may execute a program to retrieve data to be provided in response to the HTTP request.

For example, upon the initial receipt of a phone call, voice gateway 126 may provide the user with a "Welcome" message. The Welcome message can be provided by sending an HTTP request to voice application 124 to retrieve a Welcome message document. Voice application 124 acts as an application server of voice XML documents. The voice XML document including the Welcome message is provided by voice application 124 to voice XML interpreter 122 of voice gateway 126 described above. The document can be read to the user by voice gateway 126 via telephone channel connection 174C, as shown by the voice response in action 3.6.

Voice application 124 and voice gateway 126 can also request additional input from the user in an iterative sequence of signals from the user, thereby repeating actions 3.1 through 3.6 until sufficient information to identify the computer system and diagnose the problem is obtained from the user.

When sufficient information is obtained from the user via telephone channel 174C, voice application 124 may communicate with other components of system 100 to further process the information. For example, in action 3.7, voice application 124 requests that identifying module 150 identify the computer system associated with the incoming signal. Identifying module 150 can use information such as caller ID, user name, telephone number, or other data provided via the signal(s) to identify the computer system associated with the incoming telephone call. In other embodiments, an identifier for the equipment or back-end system can be provided to voice application 124. In action 3.8, identifying module 150 returns a system identifier for the computer system to voice application 124.

In one embodiment, voice application 124 can interact with help desk module 140 to create an "incident" record for the computer system problem being reported by the user. In this embodiment, an action such as action 3.9 associates the incident record with additional information about the user, problem and/or computer system from help desk module databases (not shown).

In action 3.10, voice application 124 requests diagnostic information about the identified computer system, computer system 114C in this example, from diagnostic server 132. In action 3.11, diagnostic server 132 gathers diagnostic information from one or more sources associated with computer system 114C. As described with reference to FIG. 2, these sources can include the computer system itself or another computer system or software system associated with operation of the problem computer system, here back-end system 199 (via Internet 172), as shown in action 3.11.

In embodiments in which an incident record is created in a help desk module database, the diagnostic information gathered by diagnostic server 132 is associated with the incident record. In action 3.12.1, diagnostic server 132 determines whether the diagnostic information provided is sufficient to fix the problem with the user's computer system, and if so, fixes the problem. If the diagnostic information is not sufficient to fix the problem, in action 3.12.2, diagnostic server 132 forwards the diagnostic information to help desk module 140 to be provided to a live customer service agent. Because the user is on hold on a telephone call, voice application 124 returns control to ACD switch 125 in action 3.13. In action 3.14, ACD switch 125 routes the call to an agent, who can access the diagnostic information previously provided to help desk module 140 in action 3.12.2.

In one embodiment, once the customer service agent is on the telephone with the customer, the customer service agent can use a help desk client, such as one of help desk clients 144A or 144B of FIG. 1C, to create a "help desk ticket." If a corresponding incident record has been created for the problem reported via the telephone call, the incident record and associated diagnostic information can be "linked" to the help desk ticket. The agent can then use the viewer module to view diagnostic information collected about the problem.

In one embodiment, an agent or voice application 124 can request that the user execute a "phone page." A phone page is a web page, either local to the computer system for diagnostic clients or accessed via a web site associated with voice application 124 and/or diagnostic server 132. The phone page can execute a program on the user's computer system to gather diagnostic information that can be read by the user to the customer service agent or read or provided via telephone keypad tones to voice application 124. For example, the phone page can provide an indicator of a particular item of diagnostic information, where the color of the indicator identifies a state of the indicator. The user can be asked to identify the color presented by the phone page or to select a tone indicating the color. Alternatively, the diagnostic information may be provided in the form of a diagnostic code, which can be read by the user to the agent, provided to diagnostic server 132, and/or provided to an agent, for example, as data presented by a viewer module of a help desk client, such as one of help desk clients 144A or 144B. Based upon the diagnostic information, the agent or voice application 124 can direct the user to take further actions to gather additional diagnostic information or to fix the problem.

Figure 4:
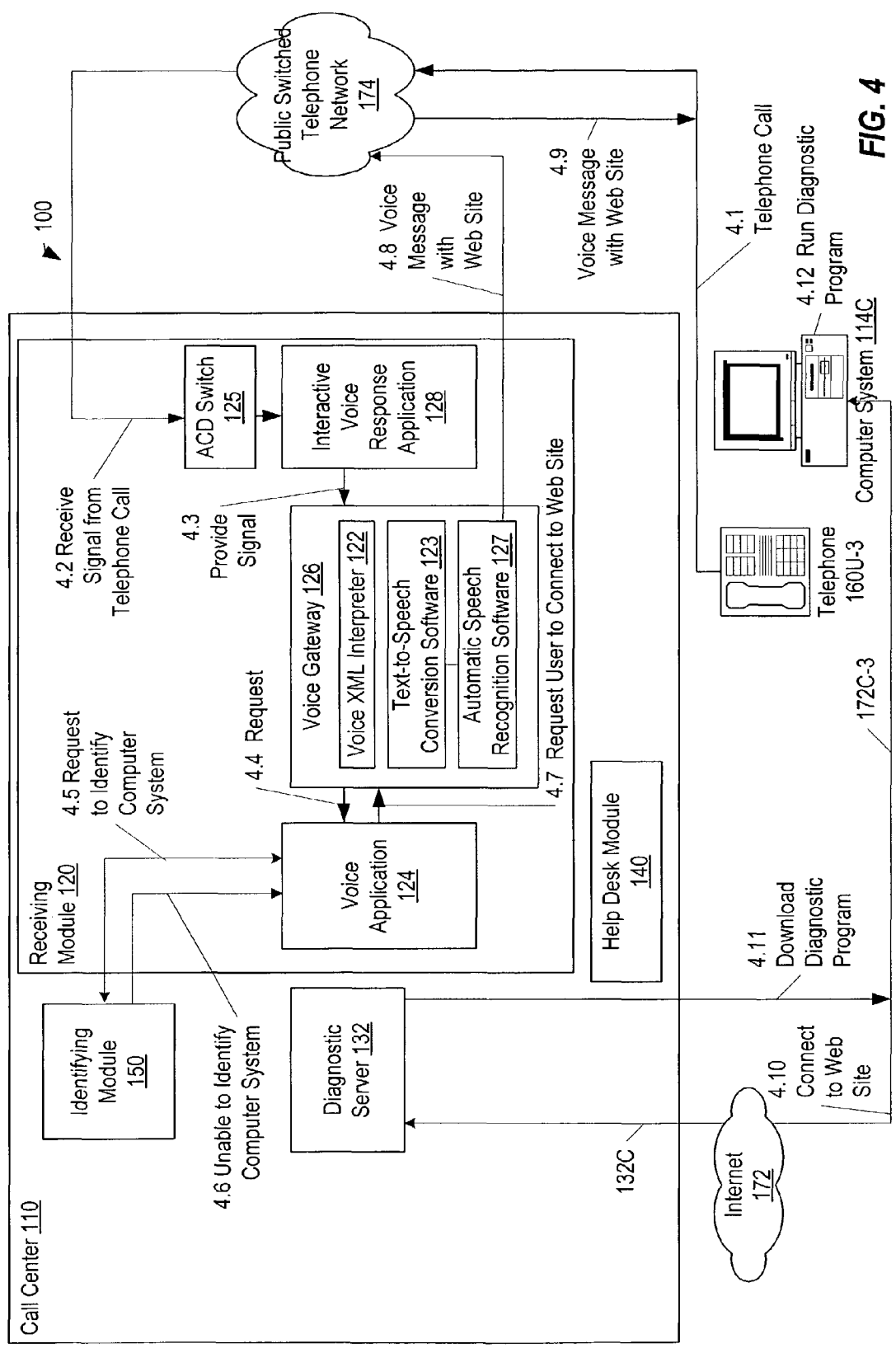
FIG. 4 is an example of a data flow including a phone page through the system of FIG. 1D.

FIG. 4 is an example of a data flow including a phone page through the system of FIG. 1D. In action 4.1, the user of computer system 114C uses telephone 160U-3 to place a telephone call to call center 110 via telephone channel 174C. In action 4.2, telephony hardware receives a signal from the telephone call, including voice and/or DTMF tones. Additional hardware and/or software may also process the signal, such as ACD switch 125 or interactive voice response application 128. In action 4.3, interactive voice response application 128 is shown as providing the signal to voice gateway 126. One of skill in the art will recognize that the signal need not pass through additional hardware and/or software. The signal may be provided directly from the telephony hardware to voice gateway 126.

In action 4.4, voice gateway 126 sends an HTTP request to voice application 124. In action 4.5, voice application 124 requests that identifying module 150 identify a computer system associated with the signal. In action 4.6, identifying module 150 communicates that the computer system cannot be identified. In action 4.7, voice application 124 can request the user to connect to a particular web site. In actions 4.8 and 4.9, voice gateway 126 provides a voice message including the name of the web site to the user's telephone 160U-3 via telephone channel 174C.

In action 4.10, the user of computer system 114C loads a browser and connects via Internet connection 172C-3 to the web site, which is associated with diagnostic server 132. In action 4.11, diagnostic server 132 downloads a diagnostic program via Internet connection 172C-3 in response to the user's connection to the web site. In action 4.12, the diagnostic program is run on the user's computer system 114C. Diagnostic information gathered by the diagnostic program may then be used by diagnostic server 132 to further diagnose and/or fix the user's computer system problem.

One of skill in the art will recognize that diagnostic information can be gathered from equipment related to the computer system and/or attached to a network in communication with the computer system. A diagnostic program may be downloaded, for example, from a back-end system, such as back-end system 199, to equipment to diagnose a problem with the equipment.

The phone page is a valuable tool for those users who cannot use the telephone and access the network (the Internet in this example) at the same time. Furthermore, the phone page enables diagnosis of computer systems, equipment, or systems related to the computer system or accessible by a network of computer systems that do not have a diagnostic client installed.

It is not necessary for operation of the invention that the user making the telephone call is in proximity to the computer system about which the user is calling. Both the user and the customer service agent can be remote from the computer system that is being diagnosed.

An Example Computing and Network Environment

Figure 5:
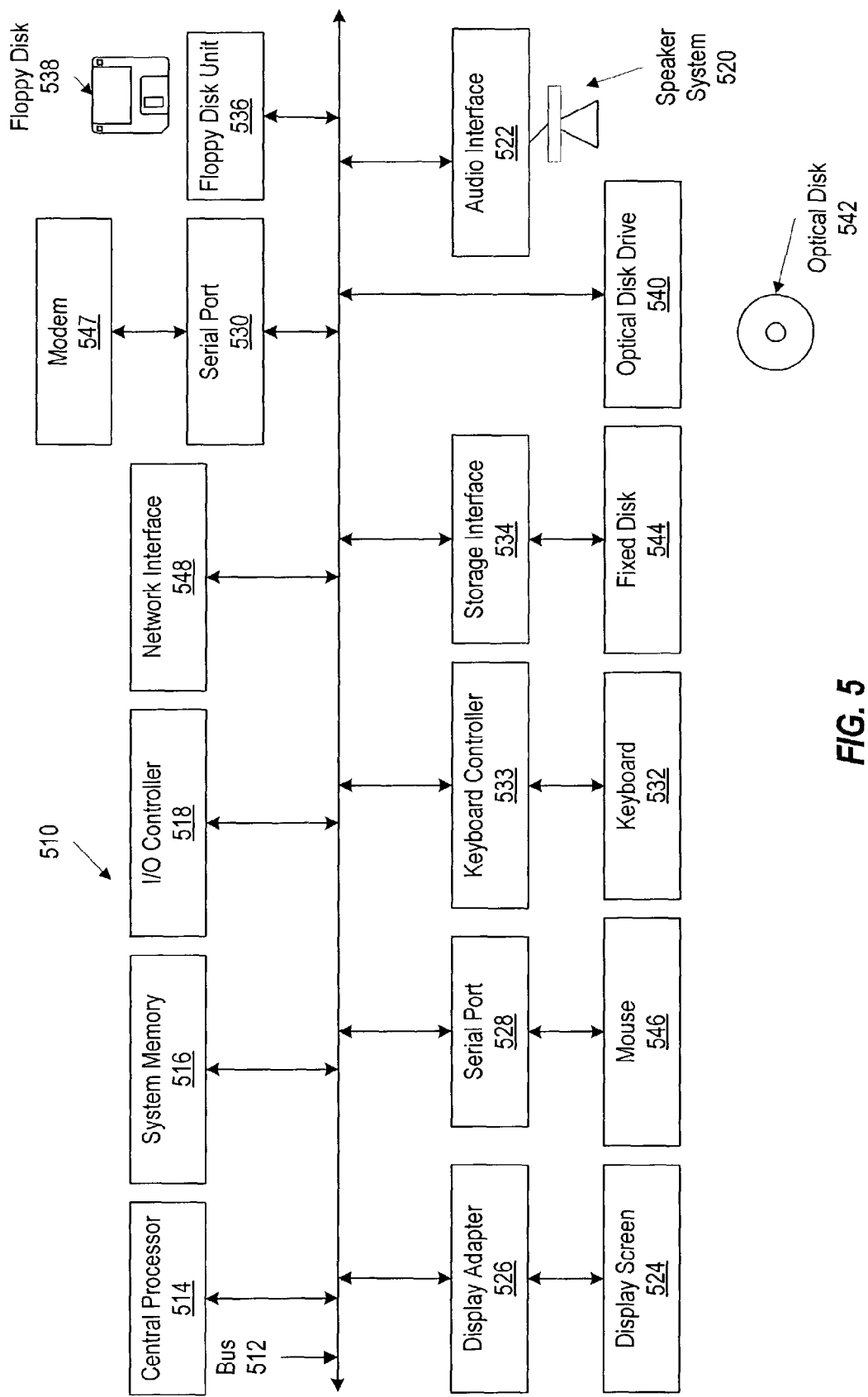
FIG. 5 is a block diagram illustrating a computer system suitable for implementing embodiments of the present invention.

FIG. 5 depicts a block diagram of a computer system 510 suitable for implementing the present invention. Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 545. Fixed disk drive 544 may be a part of computer system 510 or may be separate and accessed through other interface systems. Many other devices can be connected such as a mouse 546 connected to bus 512 via serial port 528, a modem 547 connected to bus 512 via serial port 530 and a network interface 548 connected directly to bus 512. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliances, X-window terminals, digital set top boxes, or other such computing devices. The operating system provided, on computer system 510 may be MS-DOS®, MS-WINDOWS®, OS/2®, UNIX®, Linux® or other known operating system. Computer system 510 also supports a number of Internet access tools, including, for example, an HTTP-compliant web browser having a JavaScript interpreter, such as Netscape Navigator®, Microsoft Explorer®, and the like.

Figure 6:
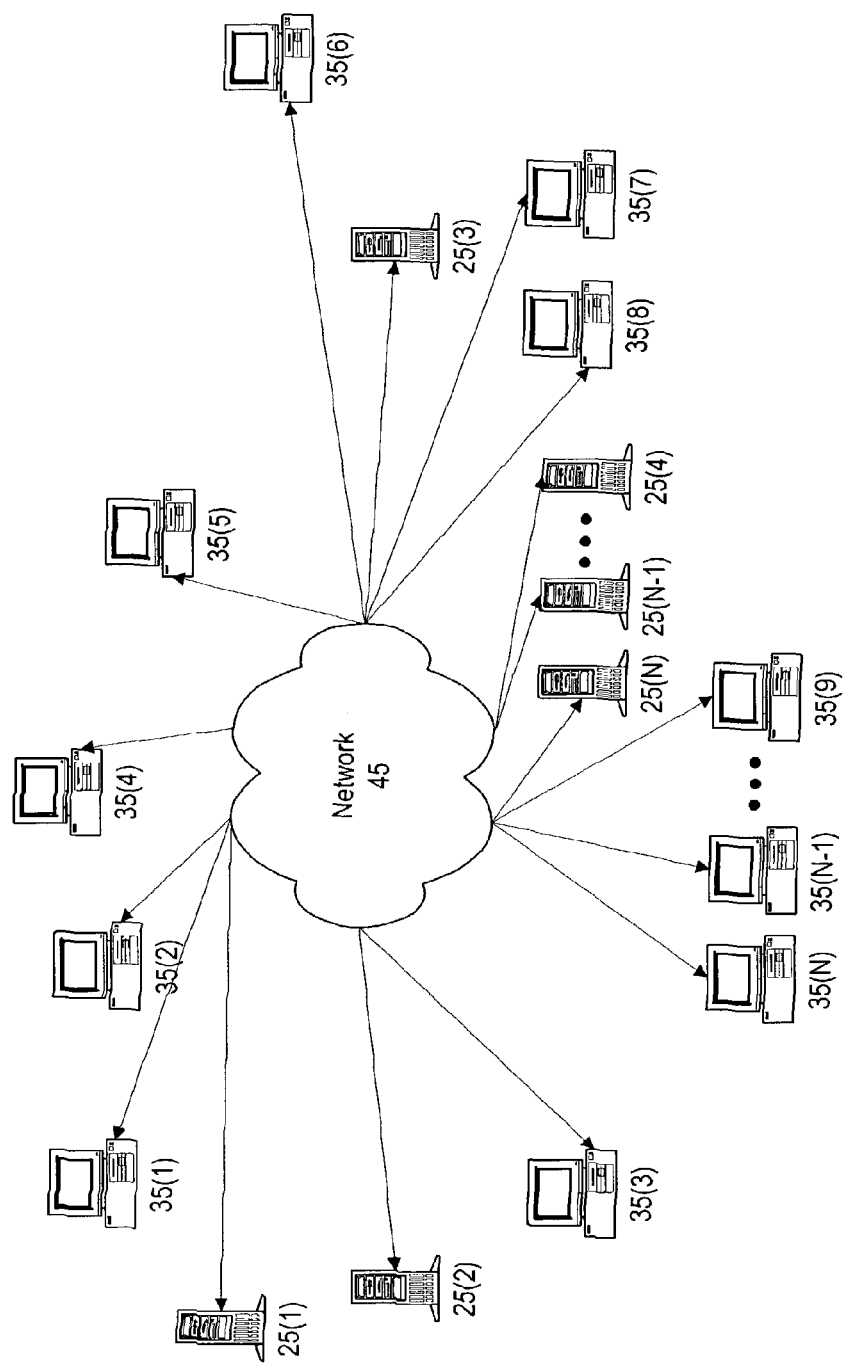
FIG. 6 is a diagram illustrating a network environment suitable for implementing embodiments of the present invention.

FIG. 6 illustrates a network environment in which the present invention may be practiced. The present invention is not limited to such a network environment and may be implemented using a variety of communication protocols and network architectures. As is illustrated in the example of FIG. 6, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service).

Client computers 35(1)-(N) access servers 25(1)-(N) through, for example, a service provider. An example of a service provider includes an Internet Service Provider (ISP) such as America On-Line™, Prodigy™, CompuServe™ or the like. Access is obtained by executing application-specific software (e.g., network connection software and a browser) on the given one of client computers 35(1)-(N). In one embodiment, this application-specific software can include a diagnostic client, such as one of diagnostic clients 134A and 134B.

As a result of using a publicly accessible network for network 45, client computers 35(1)-(N) and servers 25(1)-(N) can be distributed, for example, among one or more businesses or physical locations. One of client computers 35(1)-(N) and one of servers 25(1)-(N) may be physically close, such as in the same building, or physically distant, as when the client computer is located in a user's home and the server is at a business.

The variable identifier "N" is used in several instances in FIG. 5 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

When diagnosing a problem with a given computer system, other clients, other servers, and connected devices may all be examined as part of gathering diagnostic information. In this sense, diagnosing a problem with a given computer system may involve determining that another component of the network is the source of the problem. This diagnostic information can be reported to the user via the telephone channel or to the customer service agent as part of the diagnostic information.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing describes an embodiment wherein some components are contained within other components (e.g., the elements shown as example components of receiving module 120 in FIG. 1D). It is to be understood that such depicted architectures are merely examples; in fact, many other architectures can be implemented that achieve the same functionality. In an abstract, but still definite sense, any arrangement of components to achieve the same functionality is effectively "associated" such that the desired functionality is achieved. Hence, any components herein combined to achieve a particular functionality can be seen as "associated" such that the desired functionality is achieved, irrespective of architectures or intermediate components. Likewise, any components so associated can also be viewed as being "operably connected," or "operably coupled" to each other to achieve the desired functionality.

Advantages of the present invention are many. The invention takes advantage of a user's tendency to make a telephone call to customer service rather than to perform self-diagnosis of a computer problem via the Internet. Data can be gathered, the computer system identified, and a variety of diagnostic sources can be used to determine the cause of a user's computer system problem, without the need to consult with a customer service agent and requiring less of the user's time. Furthermore, the agent's time is better spent analyzing diagnostic information rather than obtaining the diagnostic information. Sophisticated diagnostic software can be downloaded by a user having only a web browser and a telephone. The diagnostic information can be forwarded to a live customer service agent, who can view the diagnostic information without having to repeat the work performed prior to the telephone call.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

In one embodiment, the computer systems that are diagnosed, such as computer systems 114A through 114D of FIG. 1, are digital set top boxes. A set-top box is a device that enables a television set to become a user interface to receive and decode digital television (DTV) broadcasts. In the Internet realm, a set-top box is a specialized computer system that includes a web browser, or HTTP client, that can communicate via the Internet using TCP/IP. The digital set-top box is connected via a telephone line to a service, such as a cable television service.

For digital television (DTV) broadcasts, a typical digital set-top box includes one or more microprocessors for running the operating system, such as Linux® or Windows CE, and for parsing the input transport stream, which is typically in MPEG format. A set-top box also typically includes RAM, an MPEG decoder chip, and one or more chips for audio decoding and processing. Some digital set-top boxes include a hard drive for storing recorded television broadcasts, for downloaded software, and for other applications provided by a DTV service provider.

Given the capability described for accessing other related software systems and back-end systems, the target of the diagnosis can be extended to not only the computer system, but also to the network environment in which the computer system operates. For example, data can be gathered from each of servers 35(1)-(N) of FIG. 6, as well as from other devices and peripherals (not shown in FIG. 6) that are available to each of client computer systems 25(1)-(N) via network 45.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any components herein combined to achieve a particular functionality can be seen as "associated" with each other such that the desired functionality is achieved, irrespective of architectures or intermediate components. Likewise, any components so associated can also be viewed as being "operably connected," or "operably coupled" to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving speech or DTMF tone information from a user communication via a telephone channel;
   processing said received information with a computer-based voice application configured to interpret both said speech and said DTMF tones to determine that a first computer system is associated with said user;
   conducting an automated dialog with said user to iteratively collect problem data via said speech or DTMF tones regarding a problem entity associated with said first computer system;
   determining that a data network accessed by said first computer system is a source of diagnostic information related to said problem-entity; and
   gathering the diagnostic information from said data network.

2. The method of claim 1, wherein said conducting includes forming a request to retrieve a stored response from a response server based on said data and responding to said user based on content of said stored response.

3. The method of claim 1 wherein said gathering the diagnostic information comprises accessing a second_computer system to gather the diagnostic information.

4. The method of claim 3 further comprising:
   determining that a problem related to operation of the first computer system is caused by the second computer system; and
   reporting via the telephone channel that the problem is caused by the second computer system.

5. The method of claim 1 wherein said gathering the diagnostic information comprises accessing an application program running on a second computer system to gather the diagnostic information.

6. The method of claim 1 further comprising:
   attempting to diagnose a problem with operation of the problem entity using the diagnostic information; and
   providing the diagnostic information to a human service agent.

7. The method of claim 1 further comprising receiving the user communication via a Voice Over Internet Protocol connection.

8. The method of claim 1 wherein said gathering the diagnostic information comprises accessing a second computer system to gather the diagnostic information, wherein the problem entity is the second computer system.

9. A system comprising:
   a receiving module configured to receive data including speech or DTMF tones from a user communication via a telephone channel; and
   a voice application configured to accept said data and interpret both said speech and said DTMF tones to determine that a first computer system is associated with said user, said receiving module further configured to:
      conduct an automated dialog with said user to iteratively collect problem data via said telephone channel regarding a problem entity associated with said first computer system;
      determine a first source of diagnostic information related to said problem, said first source being selected from the group consisting of:
         a data network accessed by said first computer system,
         a back-end computer system associated with said first computer system, said back-end system being associated with a provider of services to said first computer system that may affect operation of said first computer system,
         payment records related to services provided to said first computer system, and
         service equipment that provides broadband service to said first computer system; and
      gather said diagnostic information from said first source.

10. The system of claim 9, wherein said dialog includes a request based on said data to retrieve a stored response from a response server and a response to said user based on content of said stored response.

11. The system of claim 9, wherein said receiving module is further configured to:
   determine whether said diagnostic information is sufficient to resolve said problem; and
   forward said user communication to a human agent for further diagnosis of said problem if said diagnostic information is insufficient to resolve said problem.

12. The system of claim 9, wherein said problem entity is said first computer system.

13. The system of claim 9 wherein the problem entity is a second computer system associated with said first computer system.

14. The system of claim 13, wherein a program configurable to gather said diagnostic information is downloaded to the second computer system.

15. The system of claim 13 wherein:
said diagnostic information is gathered by accessing a third computer system;
a problem related to operation of the second computer system is determined to be caused by the third computer system; and
a report is made via the telephone channel that the problem is caused by the third computer system.

16. The system of claim 9 wherein the diagnostic information is gathered by accessing an application program running on a second computer system.

17. The system of claim 9, wherein said diagnostic information is used to diagnose a problem with operation of a second computer system.

18. The system of claim 9, wherein a diagnosis of a problem involving operation of the problem entity is attempted using said diagnostic information, and said diagnostic information is provided to a human service agent.

19. The system of claim 9, wherein the problem entity comprises a digital set top box.

20. The system of claim 9, wherein the user communication is received via a Voice Over Internet Protocol connection.

21. The system of claim 9, wherein said diagnostic information is gathered by providing via said telephone channel a response voice signal that requests a second voice signal, and the second voice signal is used to associate the problem entity with said first source of said diagnostic information.

22. The system of claim 9, wherein the problem entity is the second computer system, and said diagnostic information is gathered by accessing a second computer system.

23. The system of claim 9, wherein said receiving module produces a diagnostic code from said diagnostic information, and the diagnostic code is analyzed to determine said problem with said problem entity.

24. The system of claim 23, wherein said diagnostic code is provided to said user via the telephone channel.

25. The system of claim 23, wherein said diagnostic code is provided to a human agent.

26. A method of providing automated help, comprising:
receiving communication from a user via a telephone channel, said communication comprising speech or DTMF tone information;
identifying a problem computer system related to said communication by processing said communication with a computer-based voice application configured to interpret both said speech and said DTMF tones;
determining that equipment that provides broadband service is connected to said computer system; and
gathering diagnostic information from said equipment.

27. The method of claim 26 further comprising downloading to said problem computer system a program configurable to gather the diagnostic information.

28. The method of claim 26 wherein the problem computer system comprises a digital set top box.

29. The method of claim 26 wherein said gathering the diagnostic information comprises:
providing a response voice signal via the telephone channel, wherein the response voice signal requests a speech response;
receiving the speech response;
using the speech response to associate the problem computer system with a source of the diagnostic information; and
gathering the diagnostic information from the source.

30. The method of claim 26 further comprising:
producing a diagnostic code from said diagnostic information; and
analyzing the diagnostic code to determine a problem with the problem entity.

31. The method of claim 30 further comprising providing the diagnostic code to said user via the telephone channel.

32. The method of claim 26, further comprising:
determining whether said diagnostic information is sufficient to resolve said problem; and
if said diagnostic information is insufficient to resolve said problem, forwarding said user communication to a human agent for further diagnosis of said problem.

33. A method of providing automated help, comprising:
receiving communication from a user via a telephone channel, said communication comprising speech or DTMF tone information;
identifying a problem computer system related to said communication by processing said communication with a computer-based voice application configured to interpret both said speech and said DTMF tones;
associating said problem computer system with a back-end computer system associated with said problem computer system, said back-end system being associated with a provider of services to said problem computer system that may affect operation of said problem computer system; and
gathering diagnostic information from said back-end computer system.

34. The method of claim 33 wherein said gathering the diagnostic information comprises communicating with an application program controlling equipment related to the back-end computer system to gather the diagnostic information.

35. The method of claim 34 further comprising:
determining that a problem with operation of the problem computer system is caused by the equipment; and
reporting via the telephone channel that the problem is caused by the equipment.

36. The method of claim 33, wherein said back-end computer system is an e-mail server.

37. The method of claim 33, wherein said back-end computer system tracks data network outages.

38. The method of claim 33, wherein said back-end computer system is a cause of a problem with said problem computer system.

* * * * *